US010083094B1

(12) United States Patent
Thomas et al.

(10) Patent No.: US 10,083,094 B1
(45) Date of Patent: Sep. 25, 2018

(54) OBJECTIVE BASED BACKUP JOB SCHEDULING

(71) Applicant: Cohesity, Inc., Santa Clara, CA (US)

(72) Inventors: Markose Thomas, San Jose, CA (US); Chinmaya Manjunath, Santa Clara, CA (US)

(73) Assignee: Cohesity, Inc., San Jose, CA (US)

( * ) Notice: Subject to any disclaimer, the term of this patent is extended or adjusted under 35 U.S.C. 154(b) by 25 days.

(21) Appl. No.: 14/863,250

(22) Filed: Sep. 23, 2015

(51) Int. Cl.
*G06F 11/14* (2006.01)
(52) U.S. Cl.
CPC ...... *G06F 11/1461* (2013.01); *G06F 11/1451* (2013.01); *G06F 2201/84* (2013.01)
(58) Field of Classification Search
CPC ............. G06F 11/1464; G06F 11/1451; G06F 11/1469; G06F 11/1458; G06F 11/1448; G06F 11/1456; G06F 11/1461; G06F 11/1446; G06F 11/1466; G06F 3/0619; G06F 3/0689
See application file for complete search history.

(56) References Cited

U.S. PATENT DOCUMENTS

| 8,898,108 | B2 * | 11/2014 | Berinde | G06F 11/1461 707/610 |
| 8,959,509 | B1 * | 2/2015 | Sobel | G06F 9/4843 718/1 |
| 9,275,083 | B2 * | 3/2016 | Thakur | G06F 17/30289 |
| 2008/0244601 | A1 * | 10/2008 | Zeis | G06F 9/5011 718/104 |
| 2009/0240809 | A1 * | 9/2009 | La Frese | G06F 9/505 709/226 |
| 2010/0185583 | A1 * | 7/2010 | Berinde | G06F 11/1461 707/610 |
| 2016/0314020 | A1 * | 10/2016 | Miller | G06F 11/3024 |

* cited by examiner

*Primary Examiner* — Nadeem Iqbal
(74) *Attorney, Agent, or Firm* — Van Pelt, Yi & James LLP

(57) ABSTRACT

A method and apparatus for scheduling backup tasks on a source system specified by a backup job to meet a recovery point objective (RPO) specified for the backup job is presented. A method generally includes estimating resource utilization at the source system expected during a plurality of time periods based on historical resource utilization by jobs executed on the source system. The backup system estimates a time required to complete the backup tasks during each time period on the source system based on the estimated resource utilization for each time period and historical backup performance data. Upon determining that the estimated time required to complete the backup tasks for one or more of the time periods meets the RPO, the backup system schedules the backup tasks to be executed during a time period of the one or more time periods with the lowest estimated resource utilization.

21 Claims, 7 Drawing Sheets

OBJECTIVE BASED BACKUP JOB SCHEDULING

BACKGROUND

Field

Embodiments of the present disclosure generally relate to a backup system, and more specifically to scheduling backup jobs based on a recovery point objective defined for a source system and on resource utilization at the source system.

Description of the Related Art

Backing up a computer system generally includes copying the contents of the computer system to an external storage device. A basic backup operation may generate a bit-by-bit duplicate of a source system. In some cases, backup operations may compress a backup and/or compare previously backed up data to the data to be backed up, which generally uses additional resources (e.g., processing time). Thus, backing up computer systems is generally a resource-intensive operation.

Backup systems are generally configured to back up source systems or selected files stored on source systems based on a set schedule in an attempt to meet a recovery point objective (RPO). A system administrator may set backup operations on a per-system or per-application basis to run at fixed times. While backup operations can be scheduled to run during times where it can be assumed that the source system or application is lightly loaded, changes in system resource utilization and backup job load may fluctuate over time. These fluctuations may result, for example, in the backup job failing to meet the RPO for the backed up system or application.

If backup operations are scheduled during higher load periods, performance of backup operations may degrade the performance of the source system. For example, the source system may reduce the resources available to run the source system's primary function(s) (e.g., serving a website, hosting a transactional database, etc.) to allow the backup system to perform a backup at the pre-set ingestion rate. Correspondingly, if backup operations are scheduled during lower load periods, the pre-set ingestion rate may not fully utilize the resources of the source system. Backup operations at the pre-set ingestion rate may take more time to complete than backup operations performed using the resources that are not allocated to the source system's primary function(s).

In some cases, resource usage at a source system may not be predictable. Source load may spike from an assumed baseline performance (e.g., for an online shopping system, Black Friday and Cyber Monday may impose higher resource utilization). Given a pre-set backup schedule, a source system may not have enough resources available to perform its primary function when resource utilization spikes, and a backup job may fail to meet the specified RPO for a source system or application.

SUMMARY

The present disclosure generally provides a method for scheduling backup tasks on a source system to meet a recovery point objective (RPO) specified for a backup job. The method generally includes estimating resource utilization at the source system expected during a plurality of time periods based on historical resource utilization by jobs executed on the source system. The backup system estimates a time required to complete the backup tasks during each time period on the source system based on the estimated resource utilization for each time period and historical backup performance data. Upon determining that the estimated time required to complete the backup tasks for one or more of the time periods meets the RPO, the backup system schedules the backup tasks to be executed during a time period of the one or more time periods with a lowest estimated resource utilization.

Another aspect of the present disclosure provides a computer readable storage medium having instructions, which, when executed on a processor, performs an operation for scheduling backup tasks on a source system to meet a recovery point objective (RPO) specified for a backup job. The operation generally includes estimating resource utilization at the source system expected during a plurality of time periods based on historical resource utilization by jobs executed on the source system. The backup system estimates a time required to complete the backup tasks during each time period on the source system based on the estimated resource utilization for each time period and historical backup performance data. Upon determining that the estimated time required to complete the backup tasks for one or more of the time periods meets the RPO, the backup system schedules the backup tasks to be executed during a time period of the one or more time periods with a lowest estimated resource utilization.

Still another embodiment includes a processor and a memory storing a program, which, when executed on the processor, performs an operation for scheduling backup tasks on a source system to meet a recovery point objective (RPO) specified for a backup job. The operation generally includes estimating resource utilization at the source system expected during a plurality of time periods based on historical resource utilization by jobs executed on the source system. The backup system estimates a time required to complete the backup tasks during each time period on the source system based on the estimated resource utilization for each time period and historical backup performance data. Upon determining that the estimated time required to complete the backup tasks for one or more of the time periods meets the RPO, the backup system schedules the backup tasks to be executed during a time period of the one or more time periods with a lowest resource utilization.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments presented herein describe techniques for scheduling backup jobs to meet a recovery point objective for a source system or application. A backup system generally maintains a historical database of system resource utilization and backup performance. Based on the historical performance data, the backup system predicts resource utilization at a source system expected to occur at a given time in the future (e.g., a proposed backup start time) and estimates the amount of time needed to complete a backup operation on the source system. Backup operations on the source system are scheduled to meet a recovery point objective (RPO) based on the estimated amount of time for the backup operation and resource utilization at the source system.

In one embodiment, backup systems monitor resource utilization at each source system (e.g., web servers, database servers, development servers, etc.) with content to be backed up by the backup systems. Resource utilization may include performance metrics such as CPU usage, memory usage, network throughput, and other relevant metrics. A backup system includes activity monitors which record resource utilization at the source systems for a source system's primary workload(s) and backup operations. The backup system analyzes historical performance data to schedule future workloads to meet a recovery point objective while minimizing the impact of backup operations on the performance of the source system's primary workload(s).

Advantageously, scheduling backup operations based on historical performance data and a recovery point objective allows for a backup system to complete backup operations within a backup window and avoid placing unnecessary load on a source system. For example, the backup system may delay performing a backup of a source system when the source system can be expected to process a disproportionately large number of time-sensitive requests. Instead of scheduling backup operations without regard to resource utilization (e.g., on a fixed time schedule), the backup system can schedule backup operations when the server can be expected to have larger amounts of idle computing time.

Figure 1:
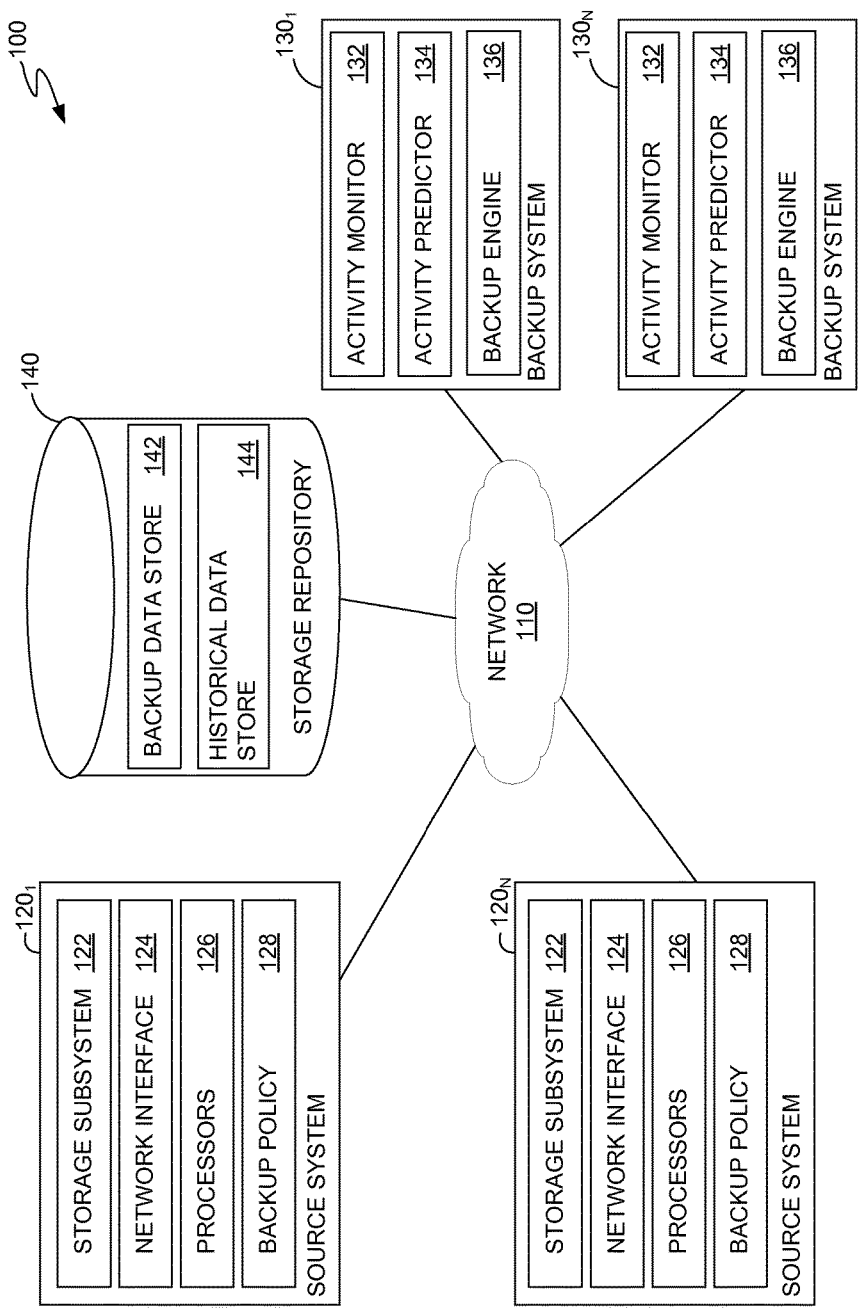
FIG. 1 illustrates an example of a networked computing environment, according to one embodiment.

FIG. 1 illustrates an example computing environment 100, according to an embodiment. As illustrated, computing environment 100 includes a plurality of source systems 120, a plurality of backup systems 130, and storage repository 140, connected to a network 110.

Each of the plurality of source systems 120 generally includes a storage subsystem 122, one or more network interfaces 124, and one or more processors 126. A source system 120 may provide various services. For example, an internet server may be installed on a source system 120 to provide web services to other machines. Some source systems 120 may host databases (e.g., relational databases or NoSQL-type data repositories) that may be accessed by one or more web services. In a development environment, one or more source systems 120 may be production machines on which a current version of software is deployed. Other source systems 120 may host code repositories and act as test systems on which software updates are deployed in a test environment before the updates are deployed on the production machines.

In some cases, source system 120 may host one or more virtual machines that may share resources (i.e., storage subsystem 122, network interfaces 124, processors 126, and/or other devices connected to source system 120). The virtual machines may be deployed similarly to physical machines in a larger system (e.g., a website host, development environment, etc.) as described above. In some cases, virtual machines may be deployed on a per-user basis in a computer network Each source system 120 is associated with a plurality of backup policies 128. Backup policies 128 may be set on a per-job basis or a per-application basis, and a system administrator may set a recovery point objective (RPO) for each of the backup policies. Backup policies set on a per-job basis generally specify a list of files, applications, and/or virtual machines to be backed up. Backup policies set on a per-application basis generally specify a particular type of application to back up (e.g., production databases, development databases, virtual desktops, communication applications, etc.).

RPOs generally specify an allowable amount of data loss for a backup operation. For a per-job backup, the RPO specifies that data is tolerated for a set amount of time (e.g., n hours or days) for the files specified in the backup job. For a per-application backup, RPOs specify how much data loss is tolerated for the entire application. For example, a relatively small amount of data loss (e.g., no more than six hours) may be tolerated for a production database (e.g., a database used in an active, customer-facing system, such as transaction and user data information in an online shopping application). Larger amounts of data loss may be tolerated for other systems, and a system administrator can set RPOs for other application types accordingly. For example, communication and collaboration applications, such as e-mail servers and team server applications, can have an RPO of 24 hours; development databases, such as code management systems for software development, can have an RPO of 48 hours; and corporate virtual desktops can have an RPO of one week.

One or more backup systems 130 may be deployed in computing environment 100. Each backup system 130 generally includes an activity monitor 132, an activity predictor 134, and a backup engine 136. Activity monitor 132, activity predictor 134, and backup engine 136 are illustrated as separate modules; however, in some cases, activity monitor 132 and activity predictor 134 may be implemented as a component within backup engine 136.

Activity monitor 132 generally includes one or more interfaces for obtaining resource utilization information from each of the source systems 120 in computing environment 100. Activity monitor 132 may periodically query a source system 120 to obtain resource utilization from one or more resources at source system 120. For example, activity monitor 132 may obtain information about read/write activity and throughput from storage system 122, throughput information (packets and/or bits transmitted and received) at network interface 124, and processor utilization (e.g., processor idle time) from one or more source systems 120. In some cases, activity monitor 132 may log instantaneous resource utilization and a moving average of resource utilization, which may smooth out resource utilization spikes. Additionally, while backup system 130 performs backup operations on one or more source systems 120 (or an application hosted on a source system 130), activity monitor 132 monitors resource utilization at the one or more source systems for backup operations.

Activity monitor 132 also includes one or more interfaces for logging resource utilization information in a data repository (e.g., historical data store 144 in storage repository 140). Activity monitor 132 generally commits resource utilization measured at a source system 120 to historical data store 144 regardless of whether backup system 130 is performing a backup operation on one or more source systems 120 or an application hosted on one or more source systems 120. In some cases, resource utilization measurements from a source system are stored in a portion of historical data store 144 dedicated to logging general system performance. After backup system 130 completes a backup operation on one or more source systems 120 (or an application hosted on one or more source systems 120), activity monitor 132 commits information identifying the backup job, resource utilization information, and a timestamp to a portion of historical data store 144 dedicated to storing performance data for backup operations.

Activity predictor 134 generally predicts resources available for backup operations at a plurality of source systems 120 and an amount of time needed to perform a specified set of backup operations on the plurality of source systems 120 based on the historical data gathered and logged by activity monitor 120. Activity predictor 134 may receive as input a timestamp indicating a time at which a backup operation may be performed and a list of sources and/or backup jobs to be executed at the indicated time. Using the input timestamp and the list of backup jobs, activity predictor 134 may analyze resource utilization saved in historical data store 144 at or around the input timestamp to predict the activities that will be performed and available resources at the source system 120. Using the predicted activities at a source system 120, activity predictor estimates an amount of time needed to perform the set of backup jobs on a source system 120. As the number of data points in historical data store 144 grows, activity predictor 134 may make better, more accurate predictions of activity and available resources at a source system 120, and consequently make more accurate predictions of the amount of time that a given set of backup operations need for completion.

Backup engine 136 accesses each of the source systems 120 (e.g., via network interface 124) to back up storage system 122 at each source system 120 to storage (e.g., storage repository 140). Backup engine 136 generally includes a backup scheduler that examines the RPO constraints for a source system 120 and the predicted backup runtime generated by activity predictor 134 to determine when backup system 130 executes backup operations on the source system 120. Generally, the backup engine 136 is configured to schedule backup operations on a source system 120 to ensure that all backup RPOs are met for a given source system.

Backup engine 134 is connected to storage repository 140. Storage repository 140 may be a distributed storage system and may contain backup data from one or more source systems 120. Storage repository 140 may include a backup data store 142 and transaction data 144.

Backup data store 142 may implement a distributed file system (e.g., a storage system compliant with the Network File System protocol) to allow backup engine 134 to write backup data to backup data store 142. In some cases, backup data store may implement a directory structure in which backup data is stored.

Backup data for a source system may be stored in backup data store 142 as an initial backup and one or more snapshots reflecting changes to the source system at a given point in time. When a snapshot is generated, backup engine 134 may store the snapshot in backup data store 142 as a series of pointers to previously stored data blocks for data that has not changed from the previous snapshot and copies of data that has changed since the previous snapshot. Thus, a snapshot generally takes up a smaller amount of space in backup data store 142 than the initial backup.

Transaction data store 144 generally provides a repository in which information about backup operations are stored. As backup engine 134 performs backup operations on source systems 120, backup engine 134 commits information about backup operations to transactional data store. In an embodiment, transaction data store 144 may implement a persistent data store which associates a backup operation with a snapshot (or initial backup) stored in backup data store 142.

Figure 2:
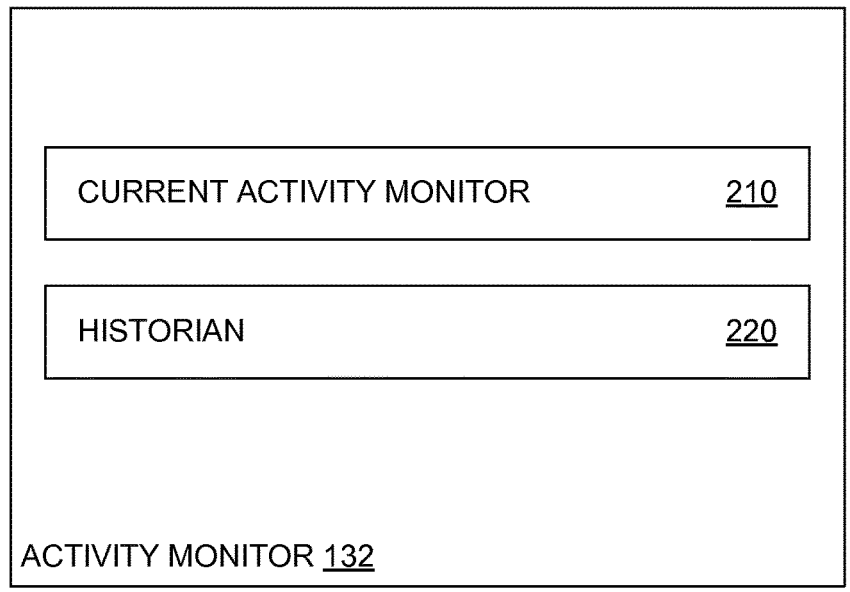
FIG. 2 illustrates a block diagram of an example activity monitor, according to one embodiment.

FIG. 2 illustrates an example block diagram of an activity monitor 132, according to some embodiments. As illustrated, activity monitor 132 may include a current activity monitor 210 and a historian 220.

Current activity monitor 132 polls each source system 120 for resource utilization data. For example, current activity monitor 132 may obtain information about data throughput at storage subsystem 122, network throughput at network interface 124, processor usage and idle time at processor 126, and other resource utilization metrics. Current activity monitor 132 may distinguish between activity monitored while backup operations are executed on a source system 120 and activity monitored while source system 120 performs substantially only its primary workload.

Additionally, current activity monitor 132 monitors total resource utilization and elapsed time during backup operations on a source system. When a backup job is completed, current activity monitor 132 can generate a report indicating, for example, the backup job, total time for backup completion, and total and average resource utilization (e.g., total source data size, average data throughput in bits per second, etc.).

Historian 220 provides an interface to storage repository 140 to store monitored performance data. As current activity monitor 132 polls a source system 120 for resource utilization data, current activity monitor can assign a timestamp to the obtained resource utilization data and commit the resource utilization data to storage repository 140 (e.g., historical data store 144). After backup system 130 completes a backup job on a source system 120, historian 220 receives a report from current activity monitor 132 including an identification of the backup job and resource utilization for the backup job. Historian 220 commits the data in the report to storage repository 140 (e.g., a repository of historical backup resource utilization data in historical data store 144).

Figure 3:
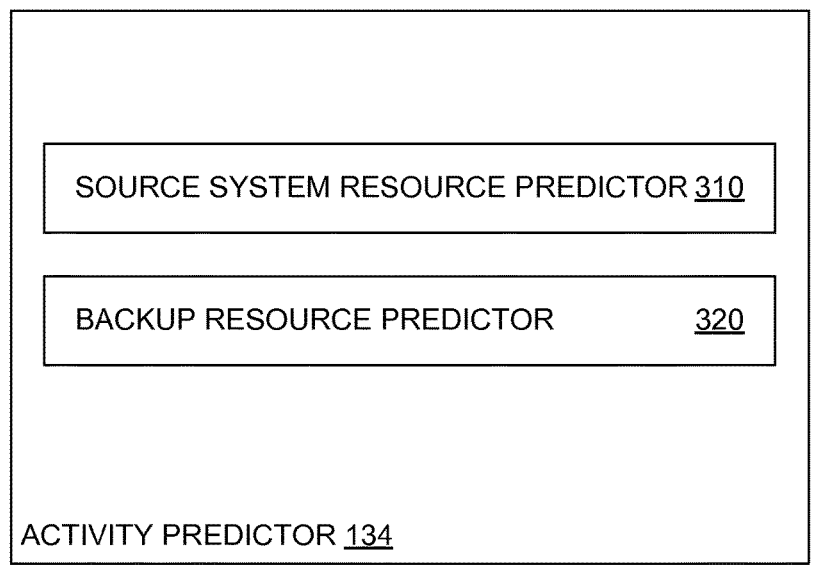
FIG. 3 illustrates a block diagram of an example activity predictor, according to one embodiment.

FIG. 3 illustrates an example activity predictor 134, according to some embodiments. As illustrated, activity predictor 132 may include a source system resource predictor 310 and a backup resource predictor 320.

Source system resource predictor 310 is generally configured to receive a timestamp (indicating a proposed time at which a backup operation is to be performed on one or more source systems 120) and a list of source systems 120 on which backup system 130 will perform a backup operation. Using the timestamp and the list of source systems 120, source system resource predictor 310 obtains historical performance data from historical data store 144 and returns a predicted amount of activity at the source and the overall system (e.g., available network bandwidth in the cluster that the source system(s) 120 are members of). As the amount of resource utilization data in historical data store 144 grows, source system resource predictor can generate resource utilization estimates at the source system based on a specified amount of the historical resource utilization data (e.g., for the last n days) or can generate a time weighted resource utilization estimate, with more recent data having a higher weight than older data.

Backup resource predictor 320 generates an estimated amount of time and resources needed to perform backup operations based on a predicted set of activities generated by source system resource predictor 310 and a timestamp indicating a proposed time at which a backup operation is to be performed on one or more source systems 120. Backup resource predictor 320 can use historical backup performance data to predict the duration and resource utilization for the next backup operation. For example, backup resource predictor 320 can calculate an average throughput (e.g., the amount of data backed up from a source system 120 per second) from previous backup operations (which may be time-weighted or averaged over the most recent n data points for the backup job). Using the calculated average throughput and the current size of the data to be backed up, backup resource predictor 320 can generate an estimated amount of time to complete a backup operation on the identified source systems 120.

In some cases, if a backup job defines an application to be backed up, backup resource predictor 320 additionally probes the application to determine the type of application to be backed up and collects the current statistics for the application, such as size, state, change rate, load, and/or activity. Backup resource predictor 320 can generate an estimated runtime using the current statistics for the application and historical backup performance data (e.g., average data throughput).

Figure 4:
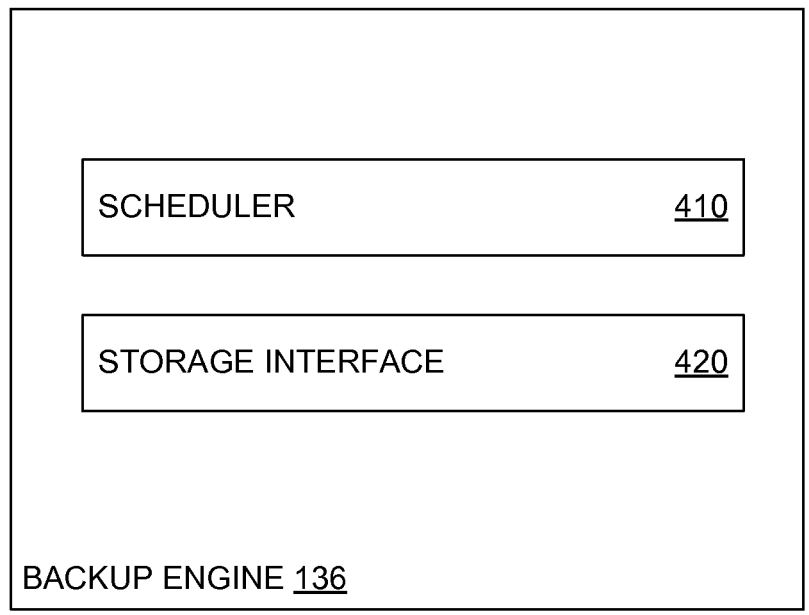
FIG. 4 illustrates a block diagram of an example backup engine, according to one embodiment.

FIG. 4 illustrates an example block diagram of a backup engine 136, according to some embodiments. As illustrated, backup engine 136 may include a scheduler 410 and a storage interface 420.

Scheduler 410 runs multiple "what-if" scenarios with the activity predictor 134 to determine when backup operations can be performed on one or more source systems 120 to meet the RPO specified for a backup job. For a given backup job, scheduler 410 obtains the timestamp for the most recent backup and the RPO specified for the backup job and generates a time at which the backup job must be completed to meet the specified RPO (e.g., timestamp+n hours). Scheduler 410 provides proposed backup start times to activity predictor 134, which, as described above, estimates source system resource utilization, backup job resource utilization, and backup job duration. Using the estimated backup job duration, scheduler 410 generates an estimated completion time (i.e., timestamp+estimated backup job duration) and compares the estimated completion time to the latest completion time to meet the specified RPO. If the estimated completion time meets the specified RPO, scheduler 410 can schedule the backup job to begin at the proposed time. Otherwise, scheduler 410 provides earlier backup times to activity monitor 134 until the estimated backup completion time meets the specified RPO for the backup job.

Storage interface 420 allows backup engine 136 to obtain data from storage subsystem 122 at a source system 120 and store backup data in backup data store 142 at storage repository 140. Storage interface 420 obtains data from storage subsystem 122 at the source system 120, and as backup engine 136 ingests data from a source system 120 through storage interface 420, backup engine 136 may write the data to backup data store 142 at storage repository 140.

In some cases, such as an initial backup of source system 120, backup engine 136 may write a bit-by-bit copy of the data obtained from storage subsystem 122 at source system 120 to backup data store 142. For subsequent backup operations of source system 120, backup engine 136 may ingest data from storage subsystem 122 at the determined data ingestion rate and compare the ingested data to data previously stored in backup data store 142. As described above, if backup engine 136 determines that the data ingested from source system 120 is the same as data previously stored in backup data store 142, storage interface 420 may write a pointer to the previously stored data in backup data store 142. Otherwise, storage interface 420 may write the new data to backup data store 142.

When backup engine 136 finishes backup operations on source system 120, storage interface 420 may commit the backup to storage repository 140. The data stored in backup data store 142 may be associated with an entry in transaction data store 144.

Figure 5:
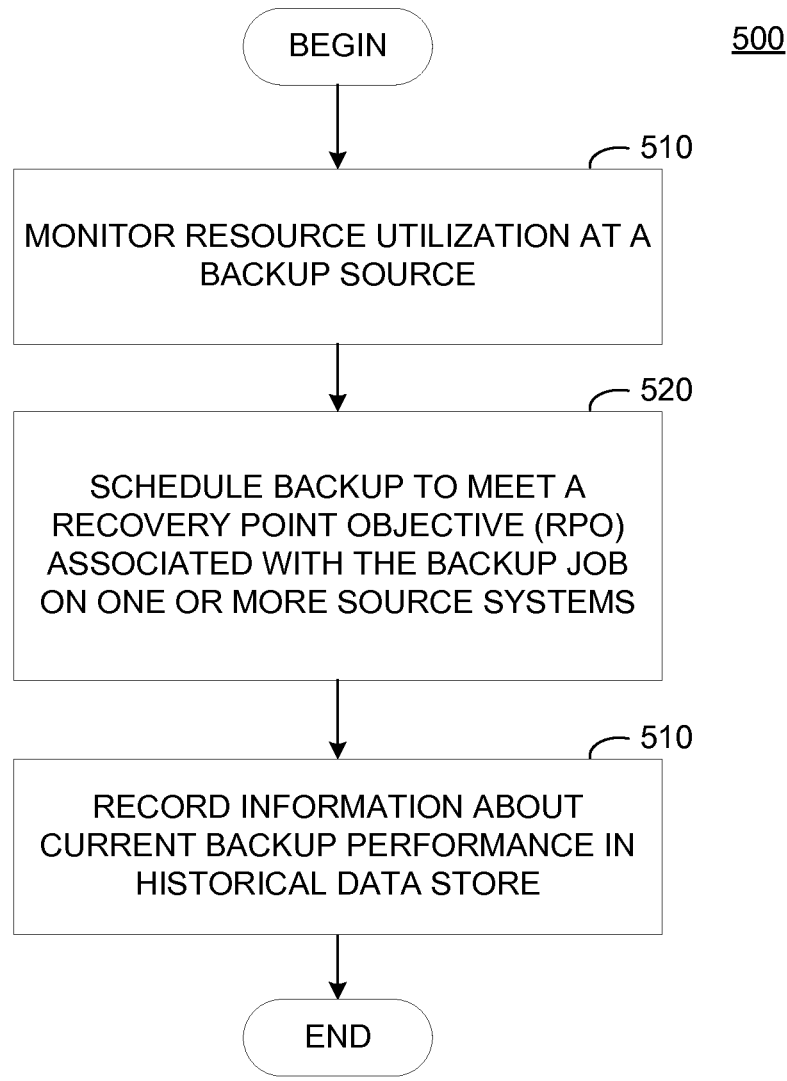
FIG. 5 illustrates an example method for performing a backup operation on a source system and recording historical backup resource utilization, according to one embodiment.

FIG. 5 illustrates example operations 500 for monitoring and recording resource utilization at a source system, according to some embodiments. Operations 500 begin at step 510, where the backup system monitors resource utilization at a backup source. As described above, resource utilization data can include network throughput, storage subsystem activity (throughput, read/write activity, etc.), processor usage and idle time, and other resource utilization metrics.

At step 520, the backup system schedules a backup on one or more source systems. The backup is scheduled based on the monitored resource utilization and an estimated resource utilization to meet an RPO specified for a backup job. As discussed above, the backup system examines the timestamp of the most recent backup and the RPO specified for the backup job to determine the latest completion time for the backup job that would meet the specified RPO. The scheduler in the backup system provides one or more proposed times to an activity predictor, which queries historical data store 144 for historical performance data for the source system and the backup job. For each of the proposed times, the activity predictor generates an estimate of the resource utilization at one or more source systems 120 and the estimated completion time for the backup job. The scheduler processes the estimated completion times and determines when to schedule the backup job to meet the specified RPO. Start times for a backup job with estimated completion times after the latest completion time may be disqualified, and the scheduler may select from one or more start times with estimated completion times that meet the specified RPO.

At step 530, after the backup job is completed, the backup system records information about backup performance in the historical data store 144. As discussed above, the recorded information can include a variety of data points, including backup duration, average data throughput, processor load dedicated to backup operations, and other relevant metrics.

Figure 6:
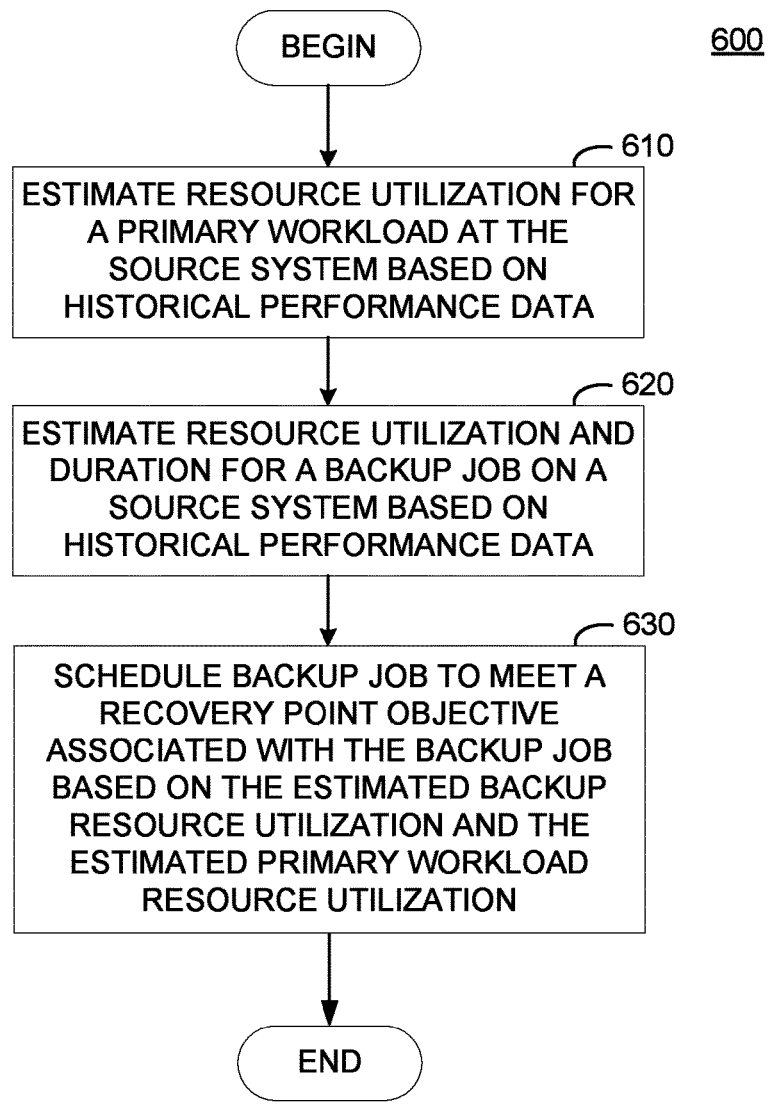
FIG. 6 illustrates an example method for scheduling a backup job to meet a recovery point objective based on historical backup job data and historical performance data, according to one embodiment.

FIG. 6 illustrates example operations 600 for scheduling a backup operation based on historical resource utilization data, according to an embodiment. Operations 600 begin at 610, where the backup system estimates resource utilization for a primary workload at the source system based on historical performance data. As discussed above, a backup system uses a timestamp indicating a proposed starting time for a backup job to query historical data store 144 for historical performance data.

At step 620, the backup system estimates resource utilization for a backup job on a source system. Estimated resource utilization for a backup job is based, at least in part, on historical performance data for the backup job. As discussed above, an activity predictor queries historical data store 144 for historical performance data for the backup job and examines the backup source(s) for backup size information. Using the historical performance data for the backup job and the size of the data to be backed up, the backup system generates estimated completion times for a backup job.

At step 630, the backup system schedules a backup job to meet a recovery point objective associated with the backup job. The backup job determines a latest completion time for the backup job based on the timestamp of the most recent backup and the RPO specified for the backup job. Based on the estimated resource primary workload resource utilization and the estimated backup resource utilization, the backup system determines when a backup can be performed to meet the RPO while imposing minimal impact to the primary workload at the targeted source systems 120.

Figure 7:
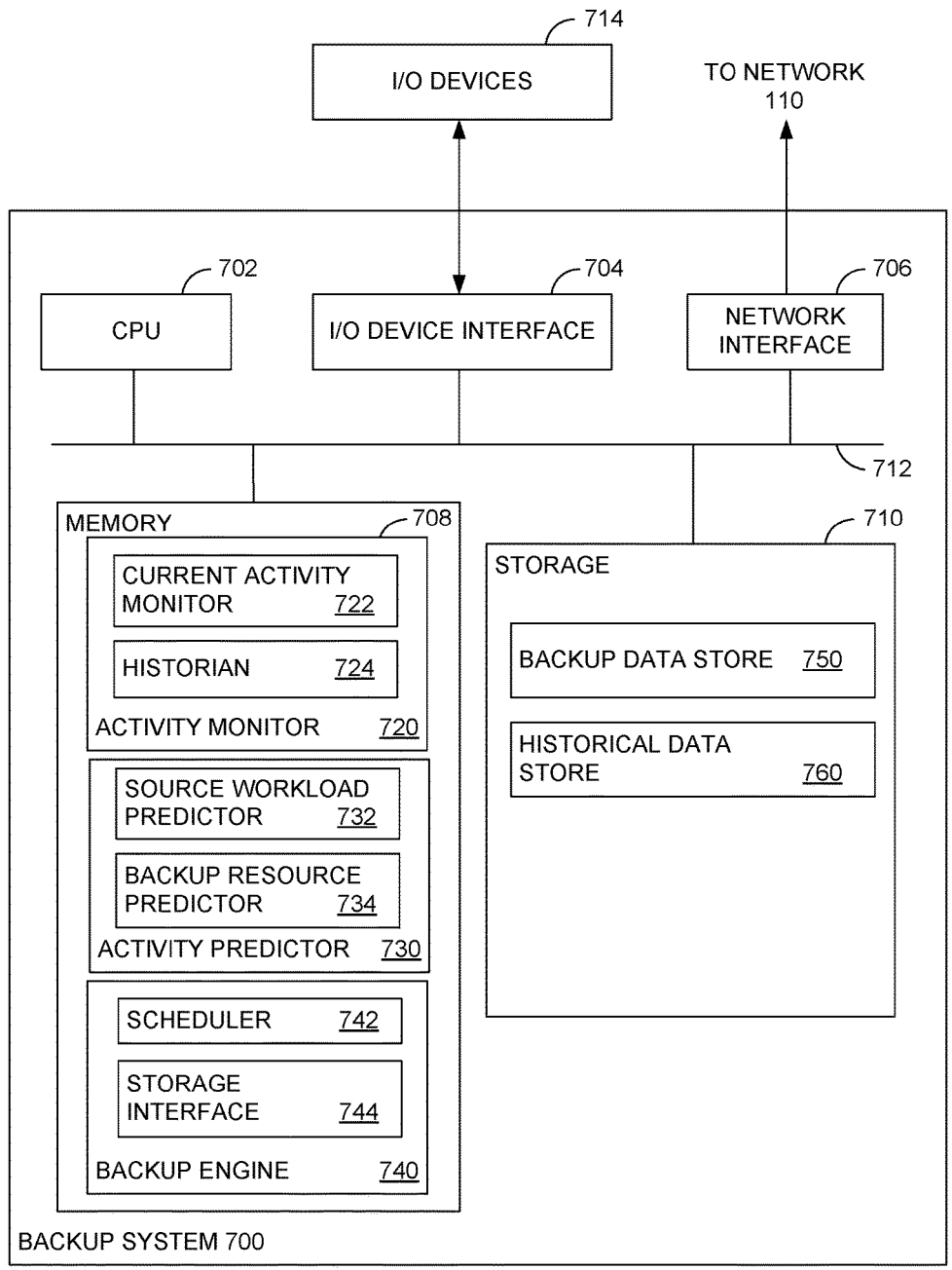
FIG. 7 illustrates an example computing system for performing backups to meet a recovery point objective based on estimated resource utilization, according to one embodiment.

FIG. 7 illustrates an example backup system 700 that uses information about resource utilization at a backup source to determine when to execute backup operations to meet an RPO based on estimated resource utilization, according to an embodiment. As shown, the backup system 700 includes, without limitation, a central processing unit 702, one or more I/O device interfaces 704, which may allow for the connection of various I/O devices 714 (e.g., keyboards, displays, mouse devices, pen input, etc.) to the backup system 700, network interface 706, a memory 708, storage 710, and an interconnect 712.

CPU 702 may retrieve and execute programming instructions stored in the memory 708. Similarly, the CPU 702 may retrieve and store application residing in the memory 708. The interconnect 712 transmits programming instructions and application data among the CPU 702, I/O device interface 704, network interface 706, memory 708, and storage 710. CPU 702 is included to be representative of a single CPU, multiple CPUs, a single CPU having multiple processing cores, and the like. Additionally, the memory 708 is included to be representative of a random access memory. Furthermore, the storage 710 may be a disk drive. Although shown as a single unit, the storage 710 may be a combination of fixed and/or removable storage devices, such as fixed disc drives, solid state drives, removable memory cards or optical storage, network attached storage (NAS), or a storage area-network (SAN).

As shown, memory 708 includes an activity monitor 720, activity predictor 730, and backup engine 740. As discussed above, activity monitor 720 generally includes a current activity monitor 722 and historian 724. Current activity monitor 722 is generally configured to obtain and log resource utilization information from one or more backup sources. The resource utilization information may include, for example, storage subsystem throughput (e.g., read/write activity), network interface throughput, processor idle time, and so on. Current activity monitor 722 may be configured to continually monitor resource utilization at one or more backup sources and log both instantaneous and average resource utilization for a primary workload at a source system and backup operations performed on the source system. Historian 724 receives the monitored resource utilization information and commits the data to a historical resource utilization data store for future use.

Activity predictor 730 generally includes a source workload predictor 732 and a backup resource predictor 734. As discussed above, source workload predictor 732 receives a timestamp indicating a proposed backup start time and queries a historical data store for historical resource utilization data. Source workload predictor 732 provides the historical resource utilization data to backup resource predictor 734. Using the historical primary workload resource utilization data, information about the size of a backup job, and historical backup performance data, backup resource predictor generates an estimated completion time for a backup operation at the proposed backup start time.

Backup engine 740 generally includes a scheduler 742 and a storage interface 744. As discussed above, scheduler 742 may provide one or more proposed start times to activity predictor 730 to obtain an estimated completion time for a backup job. Scheduler 742 determines the latest completion time for a backup job that would meet the specified RPO for the backup job and uses estimated completion times generated by activity predictor 730 to determine when to schedule the next backup of a source system 120 or application(s) hosted on one or more source systems 120.

Storage interface 744 allows backup system 700 to obtain data from a backup source and commit backup data to storage 710. Storage interface 744 may obtain data from a source system, and as storage interface 744 ingests data from a backup source, storage interface 744 compares the ingested data to corresponding data in a previous backup stored in storage 710 (e.g., in backup data store 750). If the ingested data and the previously backed up data matches, storage interface 744 writes a pointer to the previously backed up data to storage 710; otherwise, storage interface 744 writes the ingested data to storage 710. When backup engine 740 completes backup operations on the source system, storage interface 744 commits a record of the backup to storage 710.

As shown, storage 710 includes a backup data store 750 and a historical data store 760. Storage 710 may be configured as a network file store (NFS) accessible by one or more remote systems. Backup data store 750 generally includes backup data from one or more source systems. As discussed above, backup data may include a base, bit-by-bit update. Subsequent updates may generate a plurality of pointers to unchanged data from a previous update and bit-by-bit data blocks corresponding to changed or new data. Historical data store 760 generally includes historical performance data for source systems in a network and historical backup performance data for each backup job defined in a backup system.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function (s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

What is claimed is:

1. A method for scheduling backup tasks on a source system to meet a recovery point objective (RPO) specified for a backup job, comprising:
    estimating, by a processor, resource utilization at the source system expected during a plurality of time periods based on historical resource utilization at the source system during each of the plurality of time periods;
    estimating, by the processor, a time required to complete the backup tasks during each time period based on the estimated resource utilization for each time period and historical backup performance data, wherein the estimated time required to complete the backup tasks includes an estimated completion time for the backup job;
    comparing, by the processor, the estimated completion time for the backup job to a latest completion time to meet the RPO specified for the backup job, wherein the latest completion time for the backup is based on a timestamp of a most recent backup and the RPO specified for the backup job;
    in response to the estimated completion time meeting the RPO specified for the backup job, scheduling, by the processor, the backup tasks to be executed during a time period of the one or more time periods with a lowest estimated resource utilization; and
    reducing a workload of the processor at least in part by the processor performing the scheduled backup tasks during the time period with the lowest estimated resource utilization.

2. The method of claim 1, wherein the time period of the one or more time periods with the lowest estimated resource utilization corresponds to a shortest estimated time required to complete the backup tasks.

3. The method of claim 1, further comprising:
    after the backup tasks are completed, saving resource utilization data for the backup job to a historical data set, the historical data set being used to estimate the resource utilization and the time required to complete the backup tasks.

4. The method of claim 1, wherein the backup job specifies a set of files to be backed up.

5. The method of claim 1, wherein the backup job specifies an application to be backed up.

6. The method of claim 1, wherein estimating resource utilization at the source system comprises performing a time-weighted estimate.

7. The method of claim 1, wherein estimating resource utilization at the source system comprises estimating resource utilization over a specified time period.

8. The method of claim 1, wherein estimating the time required to complete the backup tasks comprises:
    determining an average backup data throughput for the backup tasks based on historical data;
    determining a size of the target data to be backed up; and
    estimating the time required to complete the backup tasks based on the size of the target data and the average backup data throughput.

9. A non-transitory computer readable medium comprising instructions that, when executed by one or more processors, performs an operation for scheduling backup tasks on a source system to meet a recovery point objective (RPO) specified for a backup job, the operations comprising:
    estimating resource utilization at the source system expected during a plurality of time periods based on historical resource utilization at the source system during each of the plurality of time periods;
    estimating a time required to complete the backup tasks during each time period on the source system based on the estimated resource utilization for each time period and historical backup performance data, wherein the estimated time required to complete the backup tasks includes an estimated completion time for the backup job;
    comparing the estimated completion time for the backup job to a latest completion time to meet the RPO specified for the backup job, wherein the latest completion time for the backup is based on a timestamp of a most recent backup and the RPO specified for the backup job;
in response to the estimated completion time meeting the RPO specified for the backup job, scheduling the backup tasks to be executed during a time period of the one or more time periods with a lowest estimated resource utilization; and
reducing a workload of the one or more processors at least in part by the one or more processors performing the scheduled backup tasks during the time period with the lowest estimated resource utilization.

10. The non-transitory computer readable medium of claim 9, wherein the time period of the one or more time periods with the lowest estimated resource utilization corresponds to a shortest estimated time required to complete the backup tasks.

11. The non-transitory computer readable medium of claim 9, wherein the operations further comprise:
after the backup tasks are completed, saving resource utilization data for the backup job to a historical data set, the historical data set being used to estimate the resource utilization and time required to complete the backup tasks.

12. The non-transitory computer readable medium of claim 9, wherein the backup job specifies at least one of:
a set of files to be backed up; or
an application to be backed up.

13. A system, comprising:
a processor; and
a memory storing one or more instructions, which, when executed by the processor, performs an operation for scheduling backup tasks on a source system to meet a recovery point objective (RPO) specified for a backup job, the operations comprising:
estimating resource utilization at the source system expected during a plurality of time periods based on historical resource utilization at the source system during each of the plurality of time periods;
estimating a time required to complete the backup tasks during each time period on the source system based on the estimated resource utilization for each time period and historical backup performance data, wherein the estimated time required to complete the backup tasks includes an estimated completion time for the backup job;
compare the estimated completion time for the backup job to a latest completion time to meet the RPO specified for the backup job, wherein the latest completion time for the backup is based on a timestamp of a most recent backup and the RPO specified for the backup job;
in response to the estimated completion time meeting the RPO specified for the backup job, scheduling the backup tasks to be executed during a time period of the one or more time periods with a lowest estimated resource utilization; and
reducing a workload of the processor at least in part by the processor performing the scheduled backup tasks during the time period with the lowest estimated resource utilization.

14. The system of claim 13, wherein the time period of the one or more time periods with the lowest estimated resource utilization corresponds to a shortest estimated time required to complete the backup tasks.

15. The system of claim 13, wherein the operations further comprise:
after the backup tasks are completed, saving resource utilization data for the backup job to a historical data set, the historical data set being used to estimate the resource utilization and the time required to complete the backup tasks.

16. The system of claim 13, wherein the backup job specifies a set of files to be backed up.

17. The system of claim 13, wherein the backup job specifies an application to back up.

18. The system of claim 13, wherein estimating resource utilization at the source system comprises performing a time-weighted estimate.

19. The system of claim 13, wherein estimating resource utilization at the source system comprises estimating resource utilization over a specified time period.

20. The system of claim 13, wherein estimating the time required to complete the backup tasks comprises:
determining an average backup data throughput for the backup tasks based on historical data;
determining a size of the target data to be backed up; and
estimating the time required to complete the backup tasks based on the size of the target data and the average backup data throughput.

21. The method of claim 1, wherein in response to the estimated completion time not meeting the RPO specified for the backup job, scheduling the backup tasks to be executed during an earlier time period of the one or more time periods, wherein the earlier time period occurs before the time period.

* * * * *